United States Patent
Choquette et al.

(10) Patent No.: US 9,930,098 B2
(45) Date of Patent: Mar. 27, 2018

(54) METHOD AND SYSTEM FOR ISP NETWORK PERFORMANCE MONITORING AND FAULT DETECTION

(71) Applicant: Hughes Network Systems, LLC, Germantown, MD (US)

(72) Inventors: George Choquette, Potomac, MD (US); Vivek Gupta, Clarksburg, MD (US); Hsiu-chu Huang, Fairfax, VA (US)

(73) Assignee: Hughes Network Systems, LLC, Germantown, MD (US)

( * ) Notice: Subject to any disclaimer, the term of this patent is extended or adjusted under 35 U.S.C. 154(b) by 405 days.

(21) Appl. No.: 14/604,461

(22) Filed: Jan. 23, 2015

(65) Prior Publication Data
US 2016/0218942 A1    Jul. 28, 2016

(51) Int. Cl.
*H04L 12/26* (2006.01)
*H04L 29/08* (2006.01)

(52) U.S. Cl.
CPC .......... *H04L 67/02* (2013.01); *H04L 43/0811* (2013.01)

(58) Field of Classification Search
CPC ............................. H04L 43/0811; H04L 67/02
See application file for complete search history.

(56) References Cited

U.S. PATENT DOCUMENTS

| 2011/0106709 | A1* | 5/2011 | Puura | G06Q 20/20 705/64 |
| 2011/0208992 | A1 | 8/2011 | Cohen et al. | |
| 2014/0222974 | A1* | 8/2014 | Liu | H04W 80/12 709/219 |
| 2014/0227976 | A1* | 8/2014 | Callaghan | G06F 8/65 455/41.2 |

OTHER PUBLICATIONS

Interational Search Report and the Written Opinion for International App No. PCT/US2016/014589, dated Apr. 11, 2016, European Patent Office.

* cited by examiner

*Primary Examiner* — Kim T Nguyen
(74) *Attorney, Agent, or Firm* — Sheppard Mullin; Daniel Yannuzzi; Jonathan Marina

(57) ABSTRACT

A monitoring tool to facilitate real-time system performance monitoring, fault detection, fault isolation, and fault remediation verification, wherein the monitoring tool is connected to each of a plurality of gateways within a network, including a request reporter module configured to record results of URL access requests from one or more end users, a processing module configured to calculate a set of metrics based on success and failure rates for each of the URL access requests recorded by the request reporter and distinguish between failures related to the network and failures unrelated to the network, and a consolidator module configured to organize and present the set of metrics into a format useable for monitoring the network.

20 Claims, 10 Drawing Sheets

| Field | Type | Null | Key | Default | Extra |
|---|---|---|---|---|---|
| domain | Text | NO | PRI | NULL | |
| domainId | bigint(20) unsigned | NO | UNI | NULL | auto_increment |

Fig. 3A

| Field | Type | Null | Key | Default | Extra |
|---|---|---|---|---|---|
| id | bigint(20) unsigned | NO | PRI | 0 | |
| time | datetime | NO | PRI | 0000-00-00 00:00:00 | |
| ipv4Count | bigint(20) unsigned | YES | | NULL | |
| httpResp | int(10) unsigned | YES | | NULL | |
| dnsResp | int(10) unsigned | YES | | NULL | |
| ipv6Count | bigint(20) unsigned | YES | | NULL | |

Fig. 3B

| Field | Type | Null | Key | Default | Extra |
|---|---|---|---|---|---|
| id | bigint(20) unsigned | NO | PRI | 0 | |
| ts | datetime | NO | PRI | 0000-00-00 00:00:00 | |
| ipVersion | tinyint(3) unsigned | NO | | 0 | |
| r1Count | mediumint(8) unsigned | YES | | NULL | |
| r2Count | mediumint(8) unsigned | YES | | NULL | |
| r3Count | mediumint(8) unsigned | YES | | NULL | |

Fig. 3C

METHOD AND SYSTEM FOR ISP NETWORK PERFORMANCE MONITORING AND FAULT DETECTION

TECHNICAL FIELD

The disclosed technology relates generally to website access monitoring and more particularly, some embodiments relate to website access monitoring for fault detection within a service provider network, independent of a particular website access being requested.

DESCRIPTION OF THE RELATED ART

By some estimates, there are approximately 800 million websites on the Internet today. Assuming that 75% of those websites are inactive, there are 200 million remaining active websites that a person may view by sending a uniform resource locator (URL) request through an Internet Service Provider (ISP).

Traditionally, website monitoring and fault detection has been handled by the website owners or web hosting providers. These entities design and employ monitoring systems to monitor particular websites and ensure that the servers hosting those websites are operational. In particular, websites and servers can be polled periodically using various protocols, such as hypertext transfer protocol (HTTP), internet control message protocol (ICMP), simple mail transfer protocol (SMTP), domain name system (DNS), secure shell (SSH), Telnet, post office protocol version 3 (POP3), and file transfer protocol (FTP), to name a few. Most monitoring systems will conduct polling requests from multiple points around the world to check the connectivity and status of websites in different regions. Using this information, the monitoring systems can provide a clear picture of the operational aspects of a website or web hosting server from a world-wide perspective.

However, these traditional monitoring systems are only relevant to website owners or web hosting providers. That is, the information is applicable only to the specific websites upon which a monitoring system is designed to monitor, and is only provided to the owner or web hosting provider of the specific websites. Therefore, while a website owner or web hosting provider may be aware of an access failure, when individuals experience a fault when attempting to access a particular website, the individuals only receive a message indicating that the URL request has failed without any other context. Because these individuals do not normally know the identity of the website owners or web hosting providers associated with websites, their only contact when issues arise is the entity providing their Internet access, i.e., an ISP.

An ISP can only solve connectivity issues related to the their network. If a website cannot be accessed due to a failed gateway in the communication path of the ISP network, the ISP can troubleshoot and fix the problem. However, if a website request fails because the server(s) hosting the website are down, the ISP is unable to solve the problem. Nevertheless, website request failures are often attributed to ISPs, resulting in lower customer satisfaction. Prolonged dissatisfaction may lead to customers leaving the ISP for reasons that are actually beyond the ISP's control.

In addition, because ISPs do not receive information related to the status of websites owned and hosted by others, an ISP is usually unaware of any issues related to URL requests until customers call to complain about the service. During these calls, the ISP is unable to provide much constructive information to the customer regarding the situation because the ISP does not actually know whether the website is properly functioning.

BRIEF SUMMARY OF EMBODIMENTS

According to various embodiments disclosed herein, an apparatus for network monitoring and fault detection using information related to website access requests can be provided. Various embodiments also provide unique features for diagnosing network connectivity issues and fault isolation.

In various embodiments, a website monitoring tool can be provided that is connected to each of a plurality of gateways within a network, wherein the monitoring tool comprises a request reporter module coupled to each of the plurality of gateways and configured to record results of URL access requests from one or more end users, a processing module communicatively coupled to the request reporter module and configured to calculate a set of metrics based on success and failure rates for each of the URL access requests recorded by the request reporter module and distinguish between failures related to the network and failures unrelated to the network, and a consolidator module communicatively coupled to the processing module and configured to consolidate and present the set of metrics outputted by the processing module in a user-friendly format for monitoring network connections.

In various embodiments, a method for real-time network performance monitoring can be provided, involving the steps of recording information related to a plurality of URL access requests from a plurality of end users, determining a status of each URL request of the plurality of URL requests, wherein the status is either that a request was successful or failed, recording the status of each URL request of the plurality of URL requests, calculating a success rate and a failure rate of for each URL request of the plurality of URL requests, and identifying network issues to facilitate network performance monitoring, fault detection, fault isolation, and fault remediation verification.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIGS. 3A-C are example processed data files in accordance with an embodiment of the technology disclosed herein.

DETAILED DESCRIPTION OF THE EMBODIMENTS

Figure 1A:
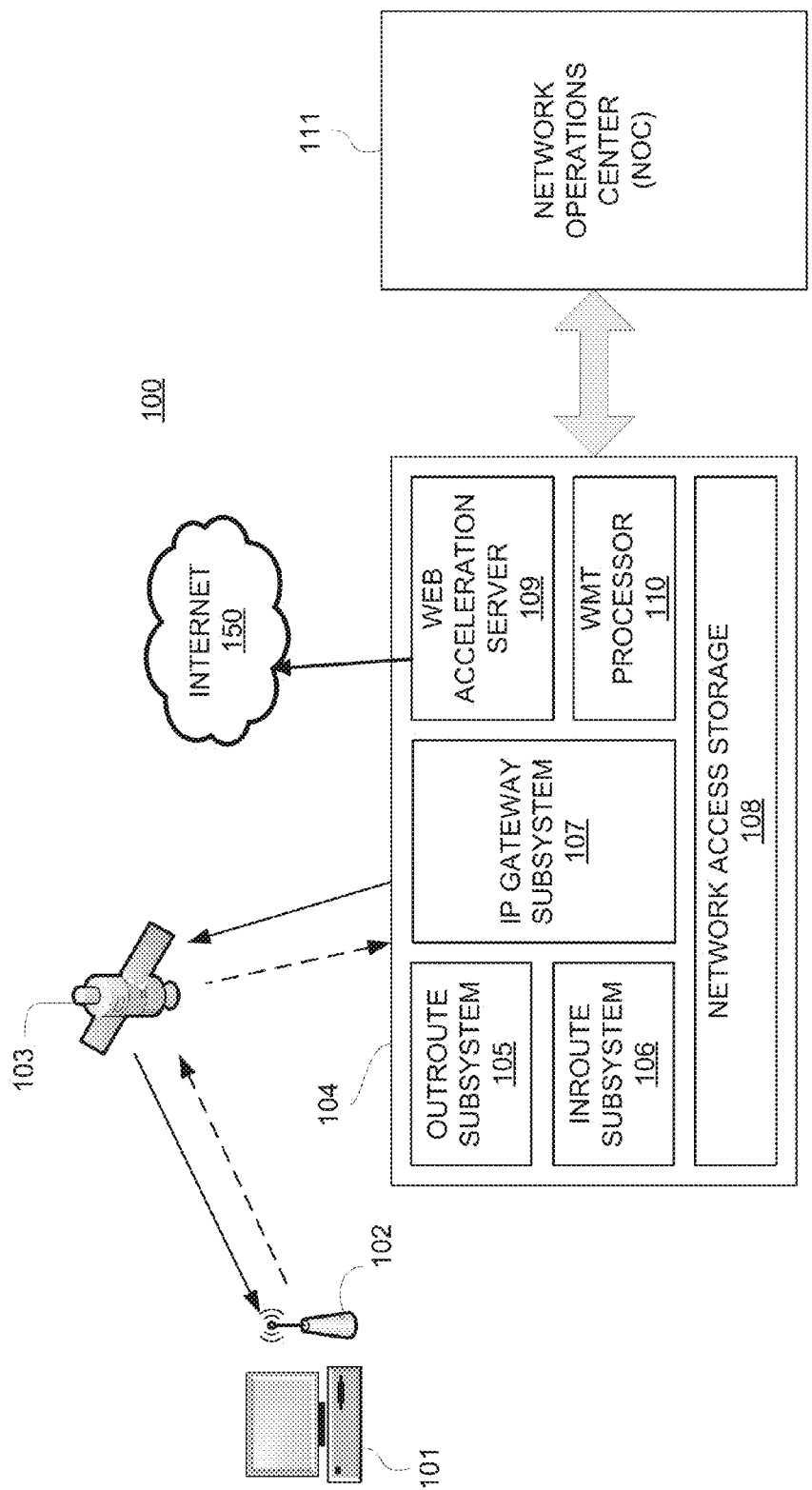
FIG. 1A is a diagram illustrating an example ISP network in with which various embodiments of the technology disclosed herein may be implemented.

Embodiments of the technology disclosed herein are directed toward systems and methods for network performance analysis by monitoring, in real-time, website request results without the need to pre-configure the tool based on a target website. Further embodiments of the technology disclosed herein include determining, based on real-time data, the "top" websites being requested by users to obtain a better understanding of network performance in real-time and provide alarms if the failure rate of access to those websites becomes too great.

Conventional website monitoring and network performance tools are inadequate for use by ISPs to monitor network performance for at least two reasons: 1) website monitoring tools are developed to target only specific websites, requiring prior knowledge of the static configuration of the target websites; and 2) network analytic tools do not provide useful, real-time data regarding network traffic with which an ISP can properly analyze the current state of the network as seen by its users. Accordingly, embodiments of the technology disclosed herein provide website monitoring without the need to pre-configure the tool based on target websites. Because website monitoring in accordance with various embodiments is website-agnostic, any and all websites on the Internet can potentially be monitored. Furthermore, embodiments of the technology disclosed herein provide analytical information on a real-time basis, thereby allowing ISPs to obtain real-time awareness of the nature of user activity, identify issues concerning user website access requests, and verify that fault remediation efforts are effective.

In particular, various embodiments disclosed herein provide techniques for monitoring the performance of a network by determining the success and failure rates of website access requests from end users throughout the network. Metrics based on the success and failure rates related to a wide range of request attributes are then determined in real-time to provide an up-to-date picture of activity across the network. The request attributes may include one or more attributes, such as, for example, IP transport type, the gateway used to fulfill the request, and the domain of the requests, among other possible attributes discussed in more detail herein. Additionally, in some embodiments, the response time associated with request success or failure may be recorded and compared with a threshold value. When the response time for a request rises above or falls below the threshold value, an alarm may be triggered to alert network administrators to indicate the presence of an issue within the network. It should be noted that because monitoring in accordance with the technology disclosed herein is based on the success of access requests, an ISP or other network administrator is capable of monitoring faults related to essentially any access request, which is not possible with conventional monitoring tools that operate in the context of a known website and are developed to monitor that website's static configuration.

Before describing the disclosed systems and methods in detail, it is useful to describe an example of an environment in which the disclosed technology can be implemented. The example network of FIG. 1A is now described for this purpose. Network 100 is a satellite broadband network, but the technology disclosed herein can be implemented on or for any network operated by an ISP independent of the communication protocol used, like cable or fiber-optic networks, for example. In the example illustrated in FIG. 1A, end user devices 101 connect to the network 100 through a user terminal 102. End user devices 101 may include any web-enabled device, including personal computers, laptops, televisions, gaming consoles, tablets, web-enabled cell phones, smartphones, web-enabled appliances, PDAs, or any other web-enabled device. End user devices 101 may be connected to the user terminal 102 directly through a wired connection utilizing USB, firewire, SATA, or any other communication protocol. End user devices 101 may also be connected to the user terminal through a router, either directly or wirelessly through a wireless-capable router.

The user terminal 102 connects with a gateway 104 through a satellite 103. Although FIG. 1A illustrates a satellite broadband network, other embodiments of the technology disclosed herein may include a terrestrial communication link between the user terminal 102 and the gateway 104, such as a cable connection, fiber-optic cabling, or wireless communication (e.g., Wi-Fi, cellular network). More than one user terminal 102 may connect to the gateway 104 through the satellite 103 to obtain Internet access over the network 100. In other embodiments, the network 100 may comprise an intranet, data network, or other type of communication infrastructure where requests are transmitted between multiple pieces of equipment.

As shown in the embodiment illustrated in FIG. 1A, the gateway 104 connects the user terminal 102 to the Internet 150. The gateway 104 may include several subsystems, including an outroute subsystem 105 for sending information to the satellite 103, an inroute subsystem 106 for receiving information from the satellite 104, and an IP gateway subsystem 107 for communicating with the Internet and executing website retrieval requests from one or more end users 101 connected to the gateway 104 through one or more user terminals 102. The gateway 104 may also include a processor 110 and a network access storage (NAS) 108.

The gateway 104 connects to the Internet through an interconnect carrier, which is a mutual connection between the network 100 and other networks making up the Internet. The interconnection may be operated by the ISP, or by another common carrier with whom the ISP has a contract to provide connection of network 100 to other third party networks making up the Internet. In other embodiments, the gateways 104 may include additional components or less than those outlined above. Moreover, the individual functionalities of the components can be combined in alternative embodiments.

In addition to the above-described components, in some embodiments, the gateway 104 may include a web acceleration server (WAS) 109. WAS 109 acts as a proxy server within the gateway 104 to reduce access times for website retrieval requests. There are many different methods by which a proxy server, like WAS 109, may reduce access time, including but not limited to the following: caching recently retrieved documents and objects; compressing documents to smaller sizes; filtering out objects, such as ads, instead of retrieving and sending the objects to the end user 101; and prefetching object URLs that are common to a domain address so that those objects do not need to be retrieved for each unique request to that domain. WAS 109 may also be an external component connected to gateway 104 to provide web acceleration, as opposed to an internal component.

The gateway 104 in the illustrated example is also connected to a Network Operations Center (NOC) 111. The NOC 111 can be used by an ISP to monitor and control the ISP network 100.

Having thus described an example environment in which the disclosed technology can be implemented, various features and embodiments of the disclosed technology are now described in further detail. Description may be provided in terms of this example environment for ease of discussion and understanding. After reading the description herein, it will become apparent to one of ordinary skill in the art that the disclosed technology can be implemented in any of a number of different networking environments (including wired or wireless networking environments) operating with any of a number of different electronic devices, whether or not according to various similar or alternative protocols or specifications.

Figure 1B:
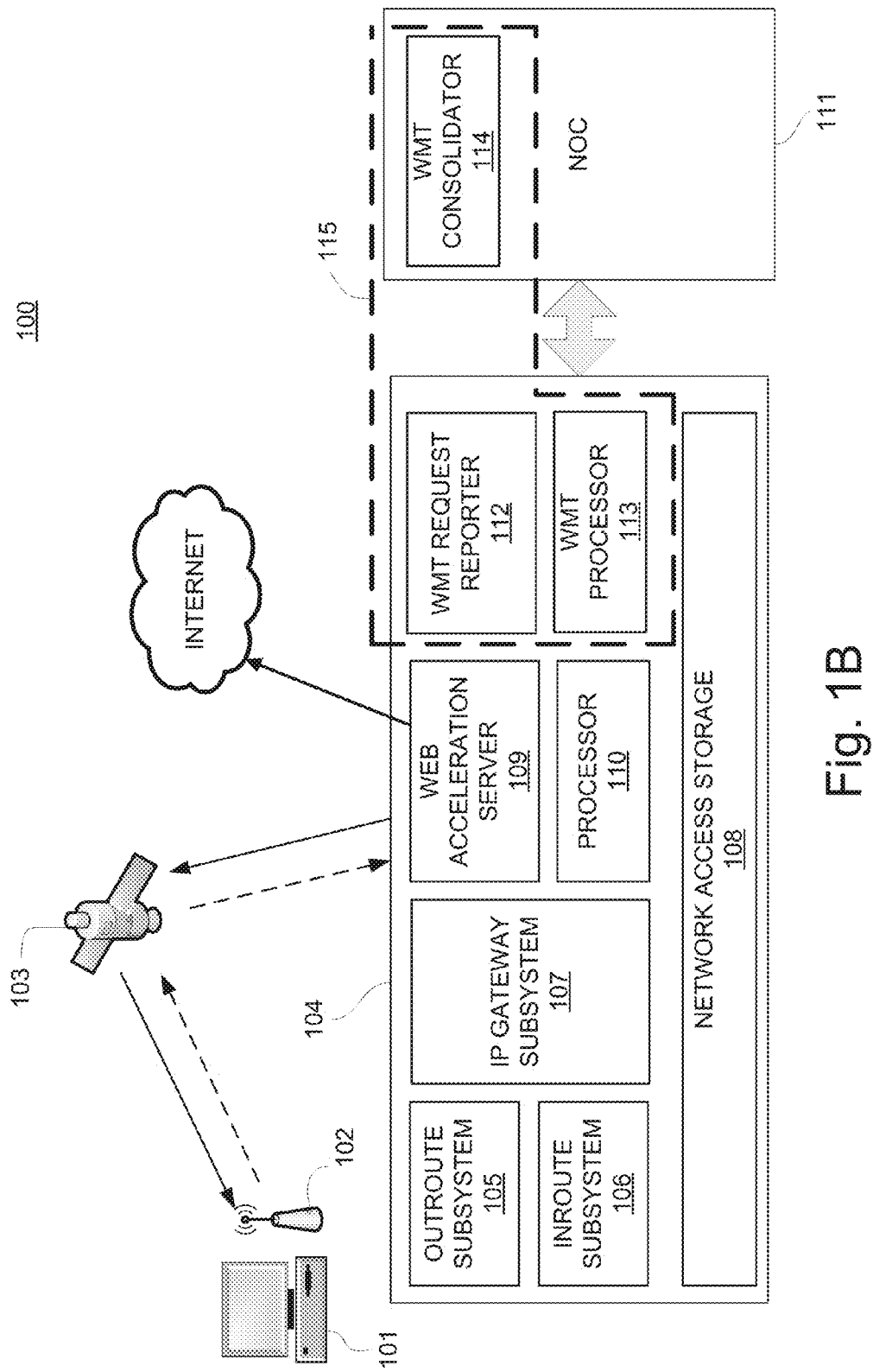
FIG. 1B is a diagram illustrating an example monitoring tool having monitoring functions in accordance with an embodiment of the technology disclosed herein.

As noted above, some embodiments of the technology disclosed herein may be implemented to provide monitoring of network performance by monitoring website access requests from end users. FIG. 1B is a diagram illustrating an example embodiment of the technology disclosed herein. In the example illustrated in FIG. 1B, the gateway 104 includes a request reporter module, shown as web-monitoring tool (WMT) request reporter 112, and a processing module, shown as WMT processor 113. Each of these modules could be separate components within gateway 104, or the module functions could be implemented within existing gateway components. For example, the WMT request reporter could be included within the WAS 109, in embodiments where gateway 104 includes an internal or external WAS 109. In addition, WMT processor could be a separate processing module within gateway 104, or the module could be implemented as an independent virtual machine (VM) (not shown). A consolidation module may also be included in various embodiments of the technology disclosed herein, shown in FIG. 1B by WMT consolidator 114. The modules will be discussed in greater detail below. Although discussed as separate modules, various embodiments of the technology disclosed herein may include the functionality of each module as one or more components within a system. Further, one or more processors, controllers, ASICs, PLAs, PALs, CPLDs, FPGAs, logical components, software routines or other mechanisms might be implemented to make up a module.

In the example illustrated in FIG. 1B, the monitoring function is performed through the collaboration of the three (3) modules: WMT request reporter 112, WMT processor 113; and a user-friendly consolidation module, such as WMT consolidator 114. Each module handles an aspect of the monitoring function to provide real-time monitoring information needed by ISPs to ensure the health of the network 100. Combined, the modules make up monitoring tool 115. More specifically, in the context of the embodiment illustrated in FIG. 1B: WMT request reporter 112 compiles the website access request information required to monitor network 100; WMT processor 113 takes the relevant website access request information and processes that information, creating the necessary metrics for determining whether there is a fault occurring and if that fault is related to network 100 or is external; and WMT consolidator 114 takes the determined metrics and organizes and compiles those metrics in a way that is understandable by NOC engineers, such that they can accurately monitor network 100.

Figure 2:
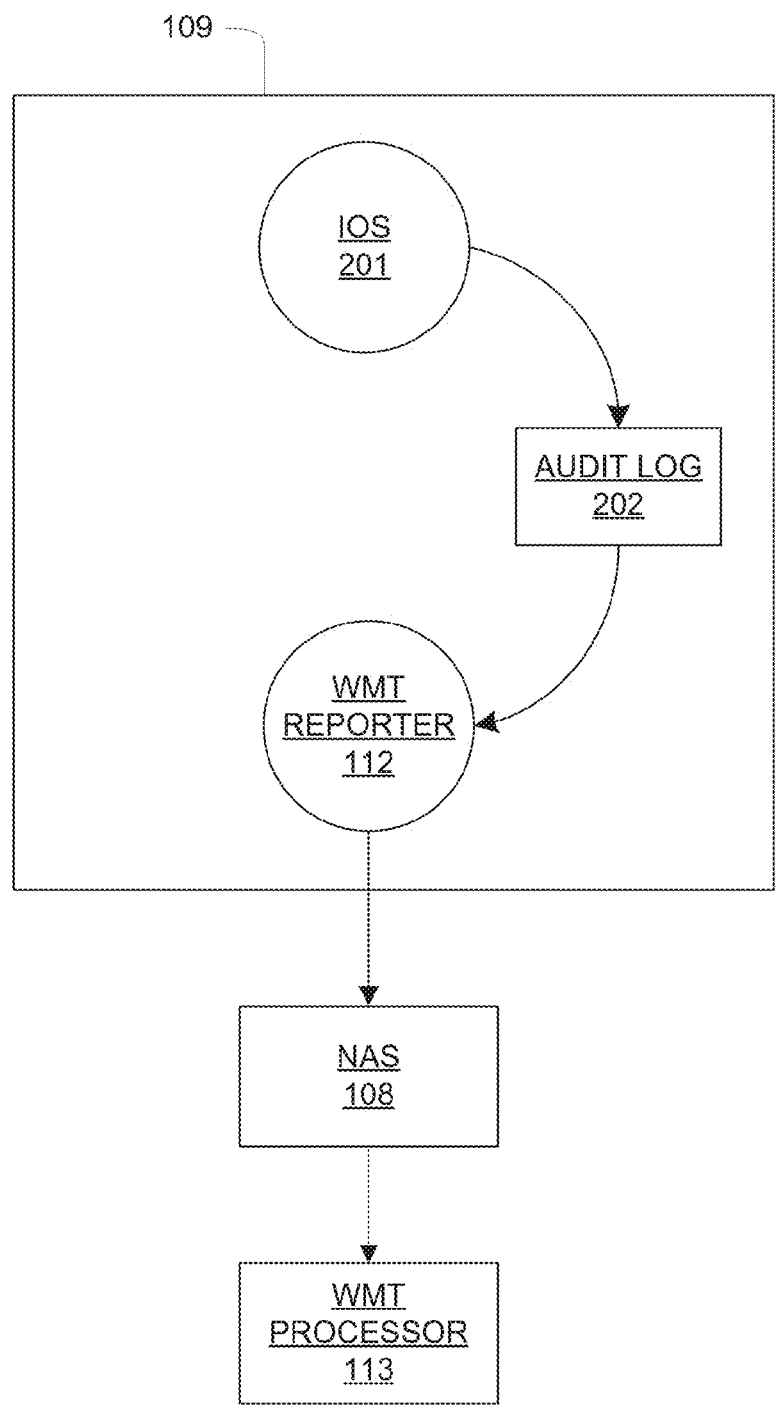
FIG. 2 is a functional block diagram illustrating an example gateway in accordance with an embodiment of the technology disclosed herein.

In some embodiments, gateway operational information may be collected by WAS 109. The gateway operational information may include an indication of the software version running on the gateway, identification of the terminals connected to the gateways, identification of the interconnect over which the gateway accesses the Internet or the rest of the network, and website access request information. In the absence of WAS 109, gateway operational data in various embodiments may be collected by processor 110 and stored in NAS 108. In some embodiments, as shown in FIG. 2, all the gateway operational information collected by WAS 109 is organized and stored by an input/output server (IOS) 201 operating within WAS 109. IOS 201 can be configured to organize all the gateway operational information collected by the WAS 109 into an audit log 202. Not all the gateway operational information collected by WAS 109 and stored in the audit log 202 is necessary to the technology disclosed herein. Indeed, some embodiments use only the website access request information. Therefore, a request reporter module, such as WMT request reporter 112, may be used to pull only the website access request information. In some embodiments, WMT request reporter 112 may be an additional module included within gateway 104, as shown in FIG. 1B. In other embodiments, WMT request reporter may be an external component connected to gateway 104 such that WMT request reporter has access to the gateway operational information. In other embodiments, WMT request reporter 112 may be a software module that is preloaded in WAS 109 or installable through updating the operating scripts of WAS 109.

WMT request reporter 112 searches the audit log 202 for the website access request information relevant to the technology disclosed herein. The type of website access request information compiled by WMT request reporter 112 may include, for example, website access failures, IP connectivity failures, HTTP access times, and DNS resolution times. Additional website access request information may also include the software versions running on each gateway 104 and user terminal 102. The data included in the website access request information may vary between embodiments of the technology disclosed herein based on the types of monitoring activities with which the ISP is concerned. All the website access request information retrieved by WMT request reporter 112 is time stamped, allowing the ISP to identify when certain events relating to website access requests occurred. The ISP provider may determine the type of data deemed relevant to monitoring website access and network performance and configure WMT request reporter 112 to retrieve that website access request information from the audit log 202.

WMT request reporter 112 may further be configured to retrieve the desired website access request information periodically according to a period set at configuration. Alternatively, it may retrieve website access request information from the audit log 202 on command by a NOC engineer seeking the current status of network 100. In some embodiments, WMT request reporter 112 may be configured to allow for both periodic retrieval of desired website access request information and the ability to request retrieval at a given moment. Each retrieval of website access request information by WMT request reporter 112 may include only new website access request information included in the audit log 202 by IOS 201 since the last retrieval by WMT request reporter 112. In this way, the system need not be bogged down by constant reprocessing of the same website access request information.

In some embodiments, WMT request reporter 112 compiles the website access request information retrieved from audit log 202 into a raw data file. This raw data file may then be stored in NAS 108. In some embodiments, WMT processor 113 and WMT request reporter 112 may comprise one component, wherein WMT processor 113 is configured to perform the functions of both WMT processor 113 and WMT request reporter 112. In such embodiments, storing of the raw data file from WMT request reporter 112 is not required, but it may still be stored on NAS 109 to assist in ensuring fast processing of information.

In typical applications, there are two categories of website access: retrievals and prefetches. Retrievals represent a request for objects within a website that cannot be prefetched from the website, such as flash objects embedded in the website. The other category is prefetches, which represents requests for objects within a website that WAS 109 is able to retrieve prior to the request. Prefetches provide a more representative data set of top-level page request access, as those types of objects will most often be associated with the top-level web page of a website. Top-level access refers to the main page of a website, such as www-.test.com. A hostname has one or more associated IP addresses. For example, top-level access would refer to a request for www.test.com, with other levels of access referring to requests for objects referenced by the top-level page. WMT request reporter 112 may be configured to specifically retrieve website access request information related to retrievals and prefetches from the audit log 202, such as the IP addresses associated with a particular hostname, to allow WMT processor 113 to determine top-level access requests. This is more pertinent to ISP providers than a list of top sites based on overall traffic because it allows the ISP to monitor and ensure that the websites of particular interest to their users at a given moment are functioning properly. In addition, because these are the websites currently being accessed by their users, ISPs have a better understanding of the health of the network in real-time, as opposed to waiting for users to call and complain about access issues.

In some embodiments, WMT processor 113 may be configured to retrieve the raw data file from the WMT request reporter 112 stored in NAS 108, and generate processed data files usable by WMT consolidator 114. The processed data files may contain different metrics based on the website access request information included in the raw data files, such as the success and failure rates of website access requests for different characteristics of each request. In some embodiments, WMT processor 113 may be configured to retrieve the raw data files from NAS 108 periodically, or WMT processor 113 may be configured to continuously monitor NAS 108 to see if any new raw data files have been stored in NAS 108 by WMT request reporter 112.

In some embodiments, the WMT processor 113 may be configured to determine a list of "top websites" in order to provide a more manageable set of websites to monitor at a given time. Given the impracticality of monitoring all possible websites accessible at one time on the Internet, an ISP might choose to focus only on ensuring that the most requested websites at a given moment are operating without fault. WMT processor 113 may be configured to aggregate all website access requests during a certain period and determine, based on the number of unique requests, the top websites relevant to end users 101 at that moment. What constitutes a unique request may be determined by evaluating the number of top-level access requests for a given domain, like the process described above regarding retrievals and prefetches. Unlike the network analytical tools currently available to ISPs, this list of top websites is not based on the static value of overall traffic but is instead tailored to provide a snapshot of the websites end users 101 are attempting to view at that time. This allows the ISP to ensure that popular websites of the moment are accessible by end users 101 and remedy those faults on network 101 that the ISP can control.

In some embodiments, WMT processor 113 may be configured to distinguish between a success or failure of a website access request from a user based on which one of the gateways 104 the request was routed through. In this way, an ISP can determine whether the failure is related to a single gateway or is instead affecting several or all of the gateways 104 in network 100.

In addition, an ISP could use the same website access request information to determine the status of a particular interconnection. Subsets of gateways 104 may connect to the Internet over the same interconnect. If the access failures are present only through one gateway 104 that would indicate that the problem is isolated to that gateway and not an issue with the interconnection because the other gateways connected through the same interconnect are not experiencing the same issue. In the alternative, if all gateways attached to the same interconnection are experiencing the same problem that indicates that the problem might be with the interconnection itself. The same idea works for determining whether a content distribution network (CDN) connected to a subset of gateways 104 is functioning properly.

In some embodiments, WMT processor 113 may also be configured to determine whether the given server farm servicing a particular website is having connection issues. This type of processing is similar to that discussed above for determining the health of interconnections and CDNs as it focuses on the health of equipment independent of network 100. If the website access request information indicates that there is no issue with the equipment within network 100, the interconnect between network 100 and the Internet, or the CDN which services a subset of gateways 104, then the ISP can determine that the issue lies with the host of the website. This may indicate a problem with the server or server farm hosting the requested website. This may be determined by WMT processor 113 analyzing success and failure rates based on the IP addresses associated with the requested websites, identified by their hostname.

Although an ISP in most applications would have no power to take steps to remedy problems existing external to network 100, the monitoring tool may still be used to verify that the issues have been resolved by conducting the same analysis as used to determine the issue. In addition, being able to identify the problem as external to network 100 allows the ISP to notify unhappy end users 101 that the issue is not with the service the ISP is providing, but with the website owner or web-hosting servers. In this way, the ISP can provide real-time status information to end users 101 regarding issues.

In some embodiments, WMT processor 113 may also be configured to run validation of the source or destination IP address of requests made by end users 101. By validating the source and destination IP addresses of website retrieval requests, the ISP can determine whether access failures were the result of issues within the network itself, unique to the particular website for which access is requested, or is due to a malformed URL of a destination address. In some embodiments, WMT processor 113 may then archive website requests that either fail or are invalid. A failed request is an access failure, where the URL was properly formatted and the website failed to be retrieved by the network 100. An invalid request occurs where the destination address cannot be verified, possibly because the URL was incorrectly entered. In some embodiments, invalid requests may be included with failed requests in determining the success and failure rates of website access requests.

In another embodiment, WMT processor 113 may also aggregate response time metrics for different website access requests. Examples of response time metrics include: average response time during a given time span; maximum response time during a given time span; minimum response time during a given time span; median response time during a given time span; response time standard deviation or variance during a given time span; and response time distribution during a given time span. This listing should not be interpreted as limiting because other response time metrics may be implemented in accordance with the technology discussed herein. An ISP can use such information regarding response times to diagnosis the overall health of network 100 by comparing the response times across different gateways 104 or terminals 102. If response time metrics differ between requests routed though different equipment, it could indicate that some equipment is operating less efficiently and may indicate a problem is developing. In addition, it could indicate that a particular website or range of websites is not as readily accessible based on a geographic region served by the particular gateway 104.

In some embodiments, WMT processor 113 may also determine the success or failure rates associated with the software version operating on the gateways 104 or the user terminals 102, or both. Such information would allow an ISP to determine whether a particular software version is having more issues than others. The ISP could then flash the terminals, in real-time, to install updated software onto the equipment so that all the equipment is operating efficiently and end users 101 can immediately have better website access over network 100.

In another embodiment, WMT processor 113 may determine the success and failure rates associated with the transport type, either over IPv4 or IPv6. By identifying the transport protocol utilized for a particular website request, the ISP can determine if the failures are the result of compatibility issues between the different versions of the IP protocol. For example, if the failure rate associated with IPv6 is higher than that of IPv4, an ISP can investigate the cause of the elevated failure rate, such as by inspecting the ISP's own IPv6 infrastructure. In this way, the ISP could identify whether the problem is within the network itself or is associated with the interconnect carrier or associated CDN provider. Further, transport type failure associated with a single web page may indicate a problem with the host.

In some embodiments, WMT processor 113 may analyze the success and failure rates based on one or more of the different identifying characteristics discussed above. For example, some embodiments might analyze success and failure rates in terms of which gateway the requests were routed through and the rates associated with specific domains. In this way, WMT processor 113 could produce data showing the relationship between end user 101 website access requests for a particular domain through individual gateways, assisting the ISP in diagnosing whether failures are associated with a specific gateway of the domain itself. If access failures occurred through all the gateways on a network 100, it would indicate the problem is external to the network 100 and resides with the domain itself. Further, if the issue does appear to be gateway related, the ISP could determine which of the specific gateways 104 based on the analysis conducted by WMT processor 113 and run diagnostics to further determine how to address the issue.

The processed data files created by WMT processor 113 may be stored in NAS 108 or in another memory module associated with WMT processor 113. The processed data files may be stored in a format compatible with WMT consolidator 114. Although the metrics calculated by WMT processor 113 allow for real-time monitoring of network 100, the processed data files containing those metrics may be stored for a particular period, such as seven days, so that WMT consolidator 114 may present the metrics concerning the success and failure rates over a certain period. By providing metrics based on the website access request information over a period of time, the ISP may identify patterns related to failures on network 100 and remedy those situations. In some embodiments, processed data files stored in NAS 108 may be saved until space is needed for newer files. In other embodiments, processed data files may be removed from NAS 108 after being queried by WMT consolidator 114, to ensure that only the latest processed data files processed by WMT processor 113 are stored in NAS 108. In other embodiments, processed data files NAS 108 may be moved by WMT consolidator to another memory component within NOC 111 for long-term storage.

In some embodiments, WMT processor 113 may create multiple processed data files based on the raw data file compiled by WMT request reporter 112. These processed data files could each organize the metrics determined by WMT processor 113 into different tables based on a certain website access request information attribute. FIGS. 3A-3C illustrate example processed data files in accordance with an embodiment of the technology disclosed herein. Although illustrating processed data files in a table format, other formats for organizing the metrics may be employed in accordance with the technology herein disclosed, such as plaintext. FIG. 3A illustrates an example of a processed data file where the metrics are organized based on the domain with which the metrics are associated, in accordance with embodiments of the technology disclosed herein. The "domain" field includes the domain name of the website for which access was requested. The "domainID" field is a code that maps the metrics relevant to the specific domain name from the other processed data files. This look-up table method allows for the metrics to be organized in a more manageable manner both for use by WMT consolidator 114 and for storing the files for later use.

FIG. 3B is a sample processed data file where the metrics are organized based on the time associated with certain website access request information, in accordance with some embodiments of the technology disclosed herein. The "id" field may be a code mapping the metrics contained in the table to a domain name in another processed data file like that shown in FIG. 3A. The "time" field may represent a timestamp. The timestamp may be in minutes, hours, days, or any other measurement of time for a period that may be applicable to different embodiments. The "ipv4Count" field may include the number of successful website access requests using IPv4 transport type that occurred during the period indicated in the "time" field. The "httpResp" field may include the average HTTP response time during the period indicated in the "time" field. The "dnsResp" field may include the average DNS response time during the period indicated in the "time" field. The "ipv6Count" field may include the number of successful website access request using IPv6 transport type that occurred during the period indicated in the "time" field. In other embodiments, more of fewer metrics may be included in other fields of the table in the processed data file.

FIG. 3C is a sample processed data file where the metrics are organized based on the time associated with certain website access request information, in accordance with some embodiments of the technology disclosed herein. The "id" field may be a code mapping the metrics contained in the table to a domain name in another processed data file like that shown in FIG. 3A. The "ts" field may be a timestamp, similar to the "time" field illustrated in FIG. 3B. The "ipVersion" field may include the transport type (IPv6 vs. IPv4) of the website access request. The "r1Count" field may include the number of DNS failures that occurred during the period indicated in the "ts" field. The "r2Count" field may include the number of TCP failures that occurred during the period indicated in the "ts" field. The "r3Count" field may include the number of HTTP failures that occurred during the period indicated in the "ts" field.

As discussed above, WMT consolidator 114 queries NAS 108 for the processed data files generated by WMT processor 113 of each gateway 104 and consolidates the processed data files from each WMT processor 113. By consolidation, this means that WMT consolidator 114 pulls metrics from the processed data files, arranges the metrics, and presents the metrics in a user-friendly manner to NOC engineers through a user interface. WMT consolidator 114 may be configured to periodically request the processed data files created by WMT processor 113, or WMT processor 113 may be configured to periodically send the processed data files to WMT consolidator 114.

Figure 4:
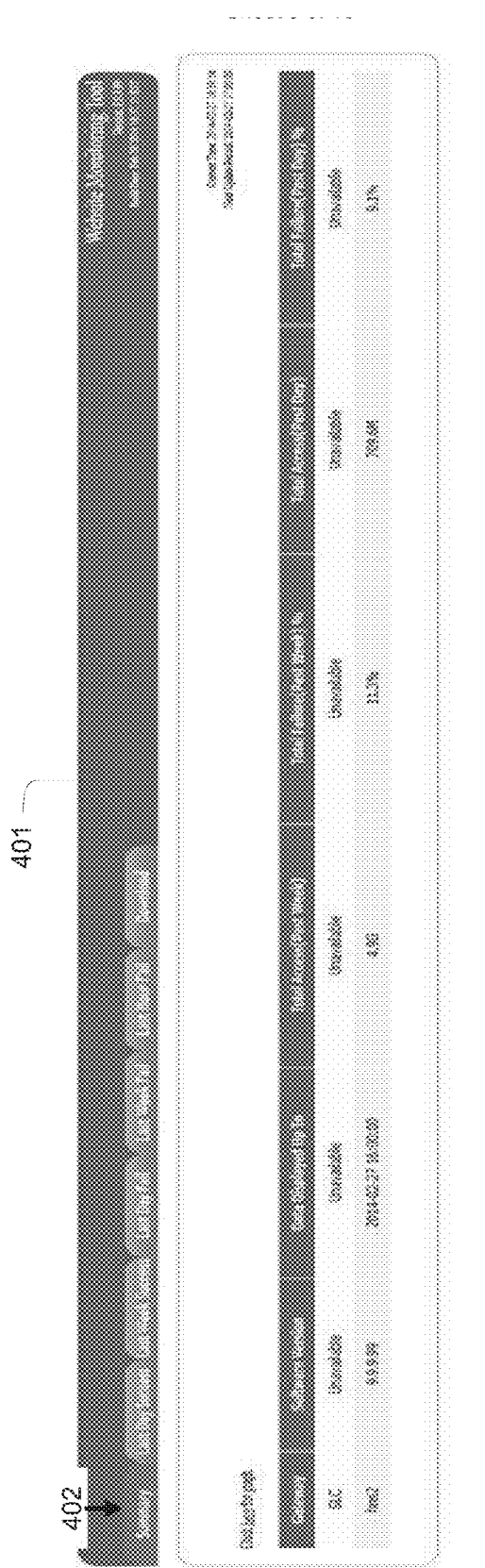
FIG. 4 is an example user interface of the web monitoring tool consolidator in accordance with an embodiment of the technology disclosed herein.

FIG. 4 shows an example web-based user interface of WMT consolidator 114. Although one example of a web-based user interface 401 is shown, the user interface may be any type of graphical user interface (GUI) that can be used to display the metrics, preferably in a user-friendly manner. As seen in FIG. 4, WMT consolidator 114 may provide a summary 402 of the connections within network 100, such as every gateway 104 and user terminal 102. Summary 402 may include the gateway operational information regarding every gateway 104 and user terminal 102 within network 100 retrieved from the audit log 202 by WMT request reporter 112 and used by WMT processor 113 in analyzing the success and failure rates website retrieval requests, such as the website access request information associated with each request discussed above in regards to the different processing methods of WMT processor 113. Other embodiments of summary 402 may include other website access request information included in the processed data files.

Figure 5:
FIG. 5 is an example of a list of "top" websites based on real-time data, as shown in a user interface in accordance with an embodiment of the technology disclosed herein.
Figure 6A:
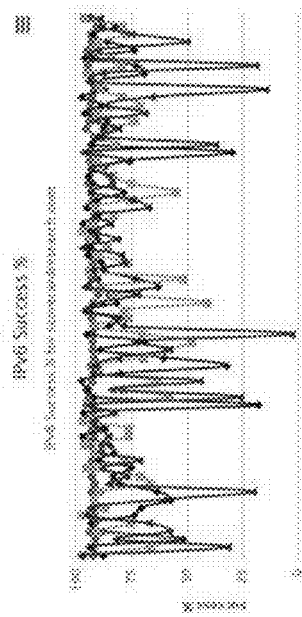
FIGS. 6A-6D are example graphs generated based on data files produced in accordance with an embodiment of the technology disclosed herein.
Figure 6B:
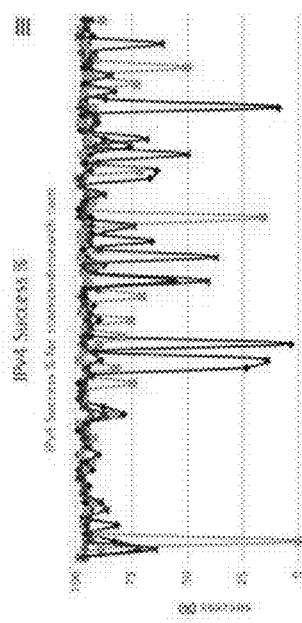
Figure 6C:
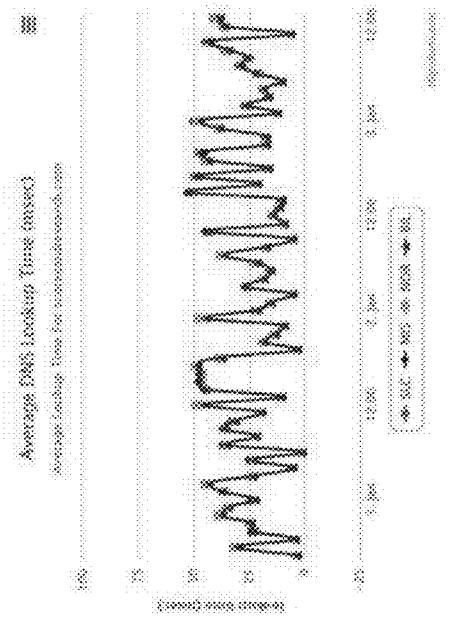
Figure 6D:
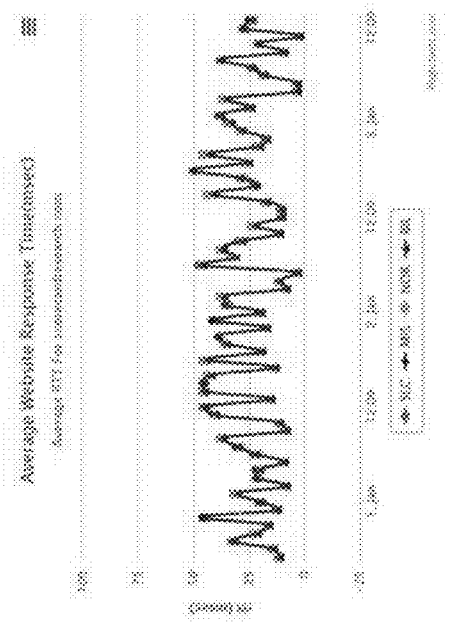

WMT consolidator 114 may also display the "top" sites determined by WMT processor 113, as shown in FIG. 5. Unlike current network analysis tools that can only display the top sites based on total traffic, the top sites included in the table shown in FIG. 5 are based on unique retrieval requests by end users, determined by compiling the requests of retrievals and prefetches by the WMT request reporter 112 as discussed above. Therefore, these top sites are a better representation of the sites of importance to end users at a particular moment. As discussed above, this allows an ISP to monitor the web activity of importance to end users 101 in real-time and remedy situations as they arise.

WMT consolidator 114 may also consolidate the metrics from the processed data files into graphs for easier interpretation by NOC engineers. As seen in FIGS. 6A-D, WMT consolidator can be used to do comparisons of success rates between IPv4 and IPv6 requests, FIGS. 6A & 6B, or between the website's response to a request and the time needed to look up DNS information, FIGS. 6C & 6D. WMT consolidator 114 creates these graphs based on the metrics included in the processed data files created by WMT processor 113. Graphs can be created based on any of metric calculated by WMT processor 113.

In another embodiment, WMT processor 113 may compare the response time metrics discussed above to certain threshold values and determine whether to send an alarm message to a simple network management protocol (SNMP) agent. An alarm could be set to go off when a particular response time metric either rises above or falls below a configured threshold. For example, in some embodiments an alarm could be triggered when the average response time for access to a particular website rises above a certain amount of time. In some embodiments, the threshold value may be set by the ISP based on administrative preferences. In other embodiments, the threshold value may be derived from the success and failure rates determined by WMT processor 113 and stored in NAS 108, WMT consolidator 114, or some other memory component for a certain period.

In some embodiments, WMT processor 113 may prioritize alarms based on real-time traffic. In some embodiments, alarms may be prioritized such that alarms related to those websites with a higher volume of access requests at a given time are triggered first, so as to bring to the attention of NOC engineers issues with websites popular in real-time. In other embodiments, alarms may be prioritized to trigger first for websites that are currently being requested at a higher frequency than others.

Figure 7:
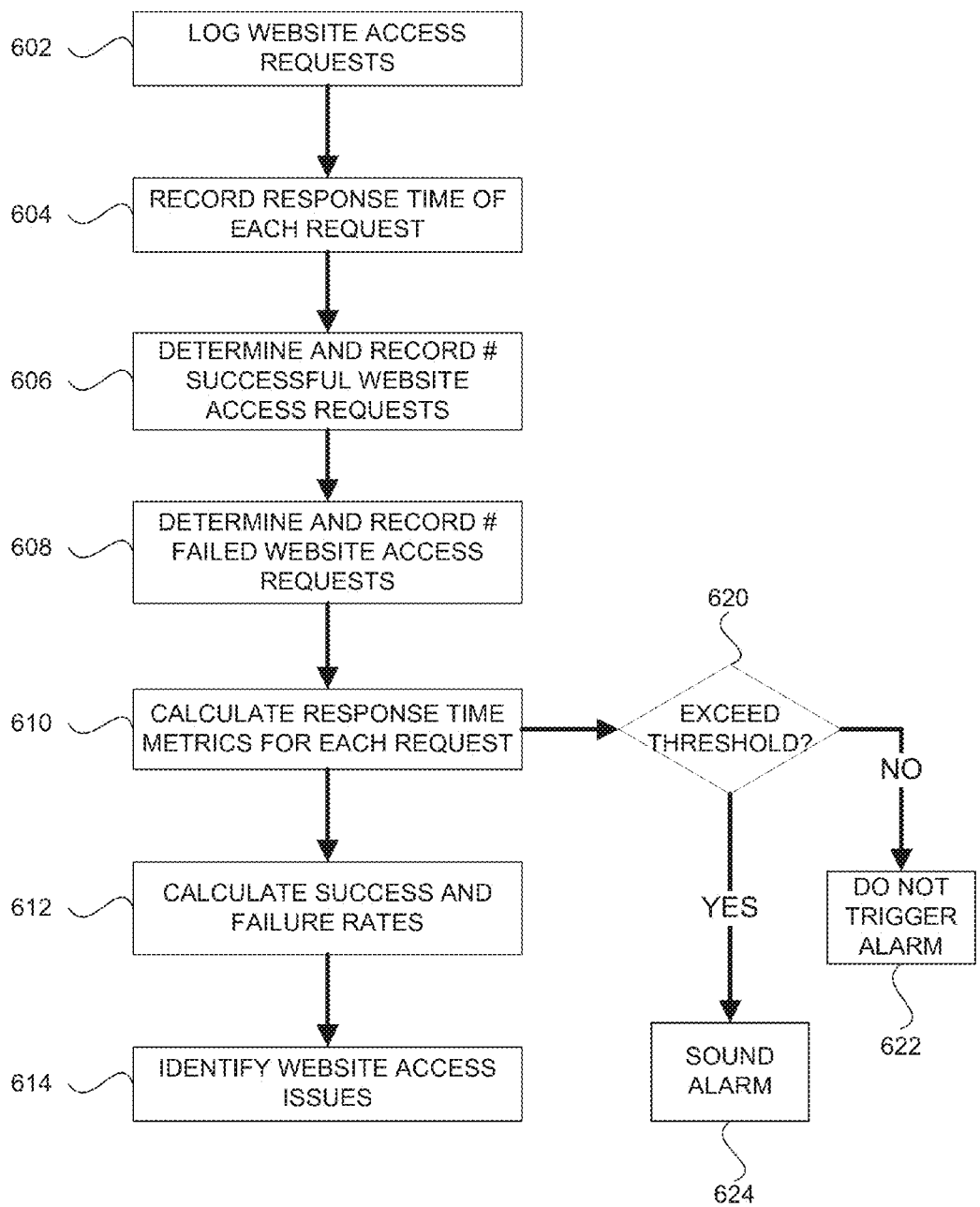
FIG. 7 is a flow diagram of an example method of monitoring websites and network performance in accordance with an embodiment of the technology disclosed herein.

FIG. 7 shows an example process that can be performed to achieve real-time website monitoring and fault detection in accordance with an embodiment of the technology disclosed herein. At step 602, website access requests from end users 101 are recorded in a request log. In some embodiments, the request log may include all website access requests from a given end user 101. In some embodiments, the request log may include only unique website access requests from a given end user, determined based on retrieval and prefetching operations similar to that discussed above. The website access request information recorded in the request log may include source and destination IP addresses, identity of originating user terminal 102, identify of corresponding gateway 104, time stamps, and gateway operational information about the gateways 104. Other website access request information may also be recorded in the request log at step 602 in other embodiments, such as website access request information for the different characteristics discussed above.

At step 604, the response times associated with each website access request logged in step 602 is recorded. The response times may include HTTP access times and DNS resolution times for each request. The response times include both the time to a successful retrieval as well as the time until a time out resulted, indicating a failure. Even if a time out does not occur, consistently long response times may indicate that there is a degradation somewhere within the system, indicating a need to investigate further. In some embodiments, the response times may be recorded in a separate response time log. In another embodiment, the response times may be recorded in the request log by making a notation next to the website access request indicating the time it took the website to respond.

At step 606, the number of successful website access requests are determined and recorded. The number of successes may be based on those requests that did not receive a time out message during the previous step. In some embodiments, the record of successes may be a separate success log. In other embodiments, the recording of successes may occur within the request log by adding an indication in the same vain as discussed above for the recorded response times.

At step 608, the number of failed website access requests are determined and recorded. The number of failures may be based on those requests that did receive a time out message during the previous step. In some embodiments, the record of failures may be a separate failure log. In other embodiments, the recording of failures may occur within the request log by adding an indication in the same vain as discussed above for the recorded response times.

At step 610, response time metrics can be calculated based on the response time data recorded in the response time log and certain characteristics of the website access requests recorded in the request log. Examples of response time metrics include: average response time during a given time span; maximum response time during a given time span; minimum response time during a given time span; median response time during a given time span; response time standard deviation or variance during a given time span; and response time distribution during a given time span. The metrics calculated in step 610 may be used in step 620 to compare against a threshold value for each metric, respectively. If the metric calculated in step 610 exceeds its corresponding threshold value, then an alarm message may be sent in step 622 to indicate that an issue with that website may exist. If the threshold value is not exceeded at step 620, then no alarm message need be sent, as indicated in step 624.

At step 612, the success and failure rates across the network are calculated. These rates may include failures based on failed requests and malformed URLs entered by the end users 101. In other embodiments, the failures may only include failures not associated with end user error.

At step 614, any website issues may be identified by comparing the response time metrics and the success and failure rates for website access requests in light of different characteristics of the website access requests recorded in the request log. These comparisons may be similar to those calculated by WMT processor 113 discussed above in regards to a system embodiment of the technology herein disclosed.

Various embodiments described herein are directed to systems and methods of monitoring the performance of a network based on the success of website access requests.

Although the various embodiments discussed were directed towards monitoring network performance in a satellite broadband network context, the technology disclosed is applicable to any communications network, such as cable networks, digital subscriber line (DSL) networks, and fiber-optic networks. Also, although the various embodiments were described in terms of access requests to websites on the Internet, the technology is applicable to any network architecture where access requests messages are sent between different computer systems, such as an intranet network or a data network.

The various embodiments have been described as providing real-time website monitoring and fault detection for monitoring network performance. The use of the phrase "real-time" does not necessarily imply that the monitoring is performed instantaneously with each website access request. As discussed above, the processing of the website access request information may be conducted periodically by the WMT processor 113, continuously based on WMT processor 113 monitoring the storage of raw data files in NAS 108, or upon request by NOC engineers. "Real-time" is used to denote that the monitoring performed is occurring without the latency associated with monitoring based on overall traffic during a set period.

Figure 8:
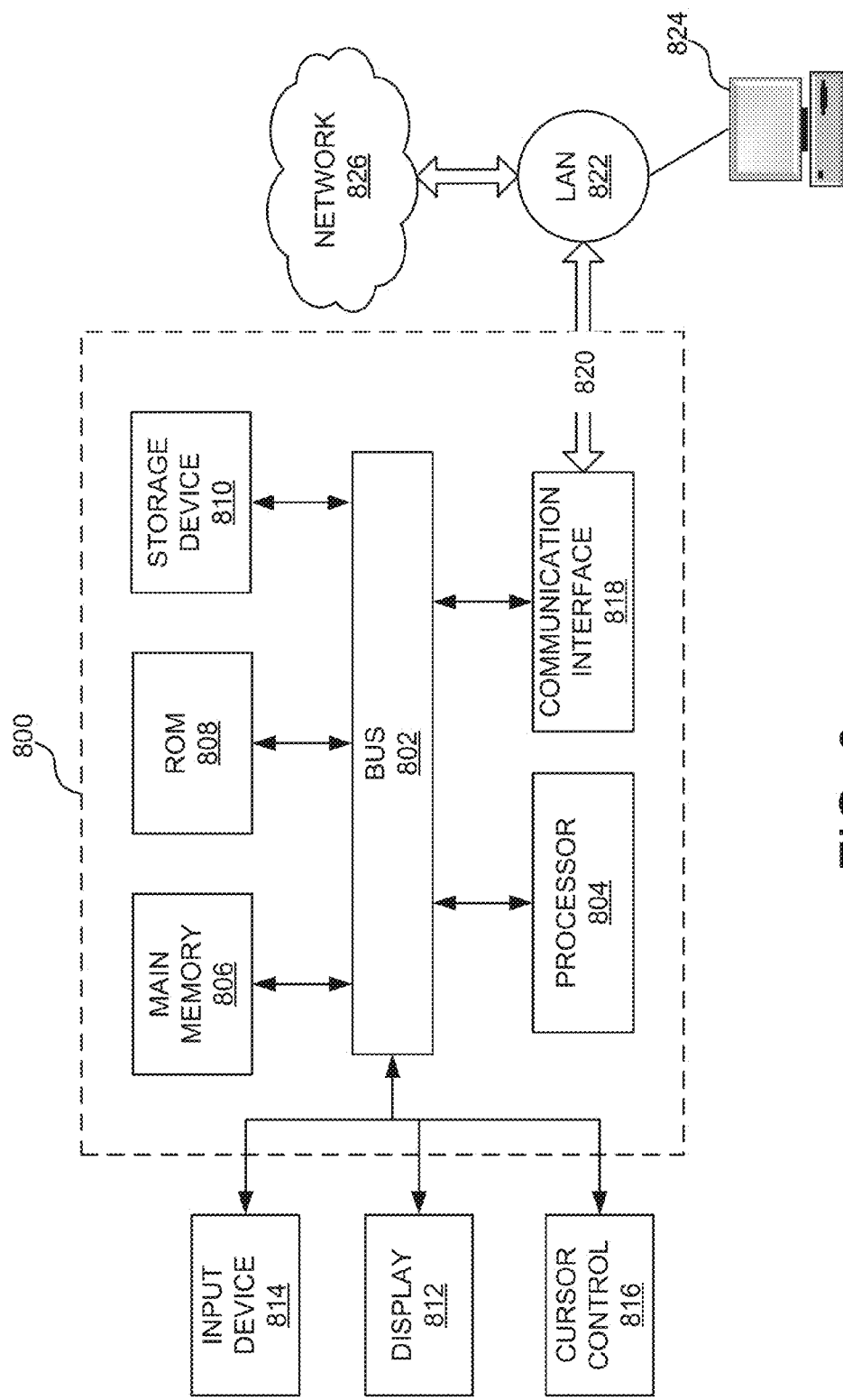
FIG. 8 is an example computing module that may be used in implementing various features of embodiments of the disclosed technology.

FIG. 8 illustrates a computer system 800 upon which example embodiments according to the present invention can be implemented. Computer system 800 can include a bus 802 or other communication mechanism for communicating information, and a processor 804 coupled to bus 802 for processing information. Computer system 800 may also include main memory 806, such as a random access memory (RAM) or other dynamic storage device, coupled to bus 802 for storing information and instructions to be executed by processor 804. Main memory 806 can also be used for storing temporary variables or other intermediate information during execution of instructions to be executed by processor 804. Computer system 800 may further include a read only memory (ROM) 808 or other static storage device coupled to bus 802 for storing static information and instructions for processor 804. A storage device 810, such as a magnetic disk or optical disk, may additionally be coupled to bus 802 for storing information and instructions.

Computer system 800 can be coupled via bus 802 to a display 812, such as a cathode ray tube (CRT), liquid crystal display (LCD), active matrix display, light emitting diode (LED)/organic LED (OLED) display, digital light processing (DLP) display, or plasma display, for displaying information to a computer user. An input device 814, such as a keyboard including alphanumeric and other keys, may be coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812.

According to one embodiment of the invention, dynamic bandwidth management, in accordance with example embodiments, are provided by computer system 800 in response to processor 804 executing an arrangement of instructions contained in main memory 806. Such instructions can be read into main memory 806 from another computer-readable medium, such as storage device 810. Execution of the arrangement of instructions contained in main memory 806 causes processor 804 to perform one or more processes described herein. One or more processors in a multiprocessing arrangement may also be employed to execute the instructions contained in main memory 806. In alternative embodiments, hard-wired circuitry is used in place of or in combination with software instructions to implement various embodiments. Thus, embodiments described in the present disclosure are not limited to any specific combination of hardware circuitry and software.

Computer system 800 may also include a communication interface 818 coupled to bus 802. Communication interface 818 can provide a two-way data communication coupling to a network link 820 connected to a local network 822. By way of example, communication interface 818 may be a digital subscriber line (DSL) card or modem, an integrated services digital network (ISDN) card, a cable modem, or a telephone modem to provide a data communication connection to a corresponding type of telephone line. As another example, communication interface 818 may be a local area network (LAN) card (e.g. for Ethernet™ or an Asynchronous Transfer Model (ATM) network) to provide a data communication connection to a compatible LAN. Wireless links can also be implemented. In any such implementation, communication interface 818 sends and receives electrical, electromagnetic, or optical signals that carry digital data streams representing various types of information. Further, communication interface 818 may include peripheral interface devices, such as a Universal Serial Bus (USB) interface, a PCMCIA (Personal Computer Memory Card International Association) interface, etc.

Network link 820 typically provides data communication through one or more networks to other data devices. By way of example, network link 820 can provide a connection through local network 822 to a host computer 824, which has connectivity to a network 826 (e.g. a wide area network (WAN) or the global packet data communication network now commonly referred to as the "Internet") or to data equipment operated by service provider. Local network 822 and network 826 may both use electrical, electromagnetic, or optical signals to convey information and instructions. The signals through the various networks and the signals on network link 820 and through communication interface 818, which communicate digital data with computer system 800, are example forms of carrier waves bearing the information and instructions.

Computer system 800 may send messages and receive data, including program code, through the network(s), network link 820, and communication interface 818. In the Internet example, a server (not shown) might transmit requested code belonging to an application program for implementing an embodiment of the present invention through network 826, local network 822 and communication interface 818. Processor 804 executes the transmitted code while being received and/or store the code in storage device 810, or other non-volatile storage for later execution. In this manner, computer system 800 obtains application code in the form of a carrier wave.

The term "computer-readable medium" as used herein refers to any medium that participates in providing instructions to processor 804 for execution. Such a medium may take many forms, including but not limited to non-volatile media, volatile media, and transmission media. Non-volatile media include, for example, optical or magnetic disks, such as storage device 810. Volatile media may include dynamic memory, such as main memory 806. Transmission media may include coaxial cables, copper wire and fiber optics, including the wires that comprise bus 802. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 9:
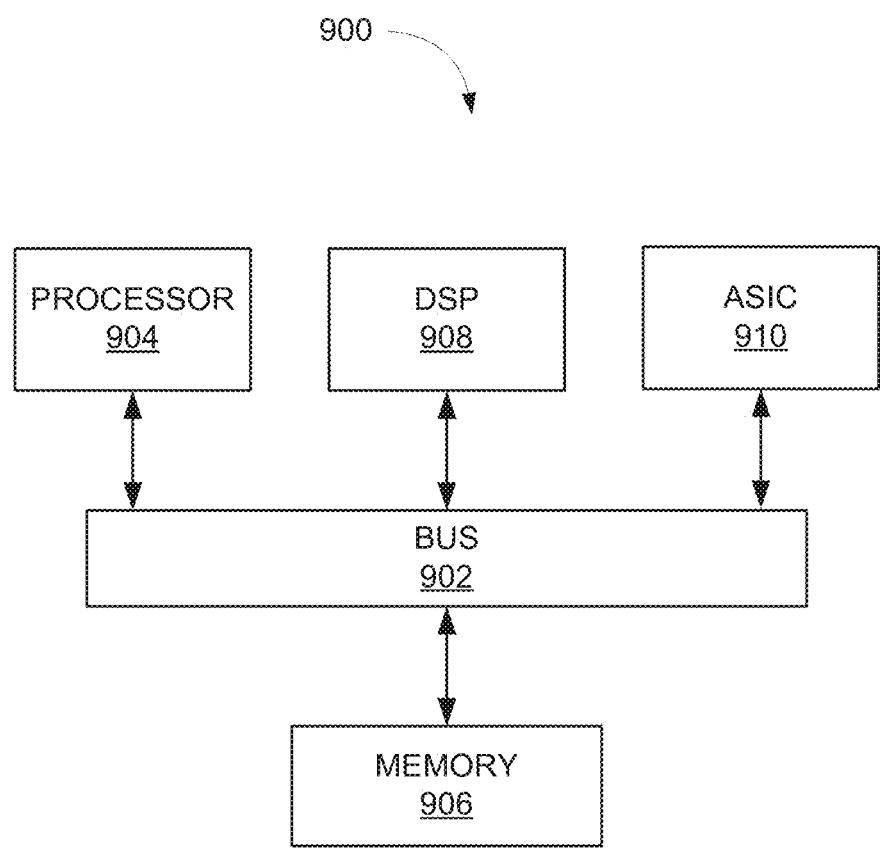
FIG. 9 illustrates an example chip set that can be utilized in implementing architectures and methods for dynamic bandwidth allocation in accordance with various embodiments The figures are not intended to be exhaustive or to limit the invention to the precise form disclosed. It should be understood that the invention can be practiced with modification and alteration, and that the disclosed technology be limited only by the claims and the equivalents thereof.

FIG. 9 illustrates a chip set 900 in which embodiments of the invention may be implemented. Chip set 900 can include, for instance, processor and memory components described with respect to FIG. 9 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 900 includes a communication mechanism such as a bus 902 for passing information among the components of the chip set 900. A processor 904 has connectivity to bus 902 to execute instructions and process information stored in a memory 906. Processor 904 includes one or more processing cores with each core configured to perform independently. A multi-core processor enables multiprocessing within a single physical package. Examples of a multi-core processor include two, four, eight, or greater numbers of processing cores. Alternatively or in addition, processor 904 includes one or more microprocessors configured in tandem via bus 902 to enable independent execution of instructions, pipelining, and multithreading. Processor 904 may also be accompanied with one or more specialized components to perform certain processing functions and tasks such as one or more digital signal processors (DSP) 908, and/or one or more application-specific integrated circuits (ASIC) 910. DSP 908 can typically be configured to process real-world signals (e.g., sound) in real time independently of processor 904. Similarly, ASIC 910 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 904 and accompanying components have connectivity to the memory 906 via bus 902. Memory 906 includes both dynamic memory (e.g., RAM) and static memory (e.g., ROM) for storing executable instructions that, when executed by processor 904, DSP 908, and/or ASIC 910, perform the process of example embodiments as described herein. Memory 906 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A monitoring tool connected to each of a plurality of gateways within a network, comprising:
   one or more non-transitory computer-readable mediums having instructions stored thereon that, when executed by one or more processors cause the monitoring tool to:
   record results of URL access requests from one or more end users;
   calculate a set of metrics based on success and failure rates for each of the recorded results of the URL access requests;
   distinguish between failures related to the network and failures unrelated to the network; and
   consolidate and present the set of calculated metrics in a user-friendly format for monitoring network connections.

2. The monitoring tool of claim 1, wherein the instructions, when executed by the one or more processors, further cause the monitoring tool to: distinguish between failures of one URL access request through one of the plurality of gateways and failures of the URL access request through the plurality of gateways.

3. The monitoring tool of claim 1, wherein the instructions, when executed by the one or more processors, further cause the monitoring tool to: record which interconnect of a plurality of interconnects each of the plurality of gateways is connected to; and
   distinguish between failures of one URL access request through one of the plurality of gateways connected to one of the plurality of interconnect carriers and failures of the URL access request through other gateways of the plurality of gateways connected to the same interconnect carrier.

4. The monitoring tool of claim 1, wherein the instructions, when executed by the one or more processors, further cause the monitoring tool to: record which content distribution network (CDN) of a plurality of CDNs each of the plurality of gateways is connected to; and
   distinguish between failures of one URL access request through one of the plurality of gateways served by a content distribution network (CDN) and failures of the URL access request through toe other gateways of the plurality of gateways served by the same CDN.

5. The monitoring tool of claim 1, wherein the instructions, when executed by the one or more processors, further cause the monitoring tool to: record a software version of each of the plurality of gateways; and
distinguish between failures of one URL access request through one of the plurality of gateways with a first software version and failures of the URL access request through the plurality of gateways with a software version different from the first software version.

6. The monitoring tool of claim 1, wherein the instructions, when executed by the one or more processors, further cause the monitoring tool to: record a software version of each of a plurality of user terminals; and
distinguish between failures of one URL access request through one of the plurality of user terminals with a first software version and failures of the URL access request through the plurality of user terminals with a software version different from the first software version.

7. The monitoring tool of claim 1, wherein the instructions, when executed by the one or more processors, further cause the monitoring tool to: record a hostname for each URL access request and one or more IP addresses associated with the hostname; and
determine failures associated with each hostname through the plurality of gateways.

8. The monitoring tool of claim 1, wherein the results of URL access requests includes a response time for each URL request from the one or more end users, wherein the response time is a time taken to complete retrieval for a URL request.

9. The monitoring tool of claim 8, wherein the instructions, when executed by the one or more processors, further cause the monitoring tool to: calculate response time metrics for each URL request, wherein the response time metrics comprises one or more of the following:
average response time during a given time span;
maximum response time during a given time span;
minimum response time during a given time span;
median response time during a given time span;
response time standard deviation during a given time span;
response time variance during a given time span; and
response time distribution during a given time span.

10. The monitoring tool of claim 9, wherein the instructions, when executed by the one or more processors, further cause the monitoring tool to: detect and trigger an alarm when one of the response time metrics for a URL request rises above or falls below a threshold value.

11. The monitoring tool of claim 10, wherein the threshold value is derived from previous response time metrics.

12. The monitoring tool of claim 1, wherein the instructions, when executed by the one or more processors, further cause the monitoring tool to: identify a set of most requested URLs.

13. The monitoring tool of claim 12, wherein identifying the set of most requested URLs comprises determining results of prefetch operations performed by a web acceleration proxy, wherein the web acceleration proxy is included within each of the plurality of gateways or connected to each of the plurality of gateways.

14. The monitoring tool of claim 12, wherein the instructions, when executed by the one or more processors, further cause the monitoring tool to: detect and trigger an alarm when a success rate for one URL of the set of most requested URLs rises above or falls below a threshold value.

15. The monitoring tool of claim 14, wherein the instructions, when executed by the one or more processors, further cause the monitoring tool to: prioritize alarms such that alarms for URLs with a higher volume of requests are triggered first.

16. The monitoring tool of claim 14, wherein the instructions, when executed by the one or more processors, further cause the monitoring tool to: prioritize alarms such that alarms for URLs with a higher frequency of requests are triggered first.

17. The monitoring tool of claim 12, wherein the results of URL access requests includes a response time for each URL of the set of most requested URLs, wherein the response time is a time taken to complete retrieval for a URL request.

18. The monitoring tool of claim 17, wherein the instructions, when executed by the one or more processors, further cause the monitoring tool to: calculate response time metrics for each URL of the set of most requested URLs, wherein the response time metrics comprises one or more of the following:
average response time during a given time span;
maximum response time during a given time span;
minimum response time during a given time span;
median response time during a given time span;
response time standard deviation during a given time span;
response time variance during a given time span; and
response time distribution during a given time span.

19. The monitoring tool of claim 18, wherein the instructions, when executed by the one or more processors, further cause the monitoring tool to: detect and trigger an alarm when one of the response time metrics for a URL of the set of most requested URLs rises above or falls below a threshold value.

20. The monitoring tool of claim 19, wherein the threshold value is derived from previous response time metrics.

* * * * *